United States Patent
Hamoir

(10) Patent No.: US 7,801,444 B1
(45) Date of Patent: Sep. 21, 2010

(54) AMPLIFICATION FOR OPTICAL FIBRE ULTRAWIDE BAND TRANSMISSION SYSTEMS

(75) Inventor: Dominique Hamoir, Nozay (FR)

(73) Assignee: Alcatel, Paris (FR)

( * ) Notice: Subject to any disclaimer, the term of this patent is extended or adjusted under 35 U.S.C. 154(b) by 2148 days.

(21) Appl. No.: 09/856,362

(22) PCT Filed: Sep. 22, 2000

(86) PCT No.: PCT/FR00/02637
§ 371 (c)(1),
(2), (4) Date: May 22, 2001

(87) PCT Pub. No.: WO01/22626
PCT Pub. Date: Mar. 29, 2001

(30) Foreign Application Priority Data
Sep. 23, 1999 (FR) .................................. 99 11875

(51) Int. Cl.
*H04J 14/02* (2006.01)
(52) U.S. Cl. ...................................................... 398/81
(58) Field of Classification Search .............. 398/79, 398/92, 142, 141, 157, 160, 81, 97, 158–159, 398/147–150
See application file for complete search history.

(56) References Cited

U.S. PATENT DOCUMENTS

| | | | |
|---|---|---|---|
| 5,386,314 A * | 1/1995 | Jopson | ............ 359/326 |
| 5,847,862 A | 12/1998 | Chraplyvy et al. | |
| 6,088,152 A * | 7/2000 | Berger et al. | ............ 359/334 |
| 6,275,313 B1 * | 8/2001 | Denkin et al. | ............ 398/9 |
| 6,356,384 B1 * | 3/2002 | Islam | ............ 359/334 |
| 6,504,972 B2 * | 1/2003 | Watanabe | ............ 385/24 |
| 6,587,241 B1 * | 7/2003 | Saleh | ............ 398/92 |
| 6,611,369 B2 * | 8/2003 | Matsushita et al. | ............ 359/334 |
| 6,654,162 B2 * | 11/2003 | Akasaka et al. | ............ 359/334 |

FOREIGN PATENT DOCUMENTS

EP         0749224 A2  *  12/1996

OTHER PUBLICATIONS

J. Kani et al, Bidirectional transmission to Suppress Interwavelength-Band NonLinear Interactions in Ultrawide-band WDM Transmission Systems, IEEE Photonics Technology Letters, US, IEEE, Inc. NY, vol. 11, No. 3, Mar. 1999, pp. 376-378, XP000823483.
X. Y. Zou et al, "Compensating of Nonuniform gain Induced by Raman Scattering and EDFAS in Ultralong-Distance WDM Links", Optical Fiber Communication, US IEEE, 1995, pp. 152-153, XP000517683.

* cited by examiner

*Primary Examiner*—Leslie Pascal
(74) *Attorney, Agent, or Firm*—Sughrue Mion, PLLC

(57) ABSTRACT

The invention relates to a very broad band wavelength multiplexed transmission system, typically having a bandwidth greater than 150 nm or 200 nm, and in which energy transfers between channels caused by the Raman effect are compensated. The depletion of channels at shorter wavelengths is compensated by amplification which is preferably distributed, while the enrichment of channels at longer wavelengths is compensated by attenuation.

24 Claims, 8 Drawing Sheets

Compensating means

301

302

Compensating means

Fig. 3a

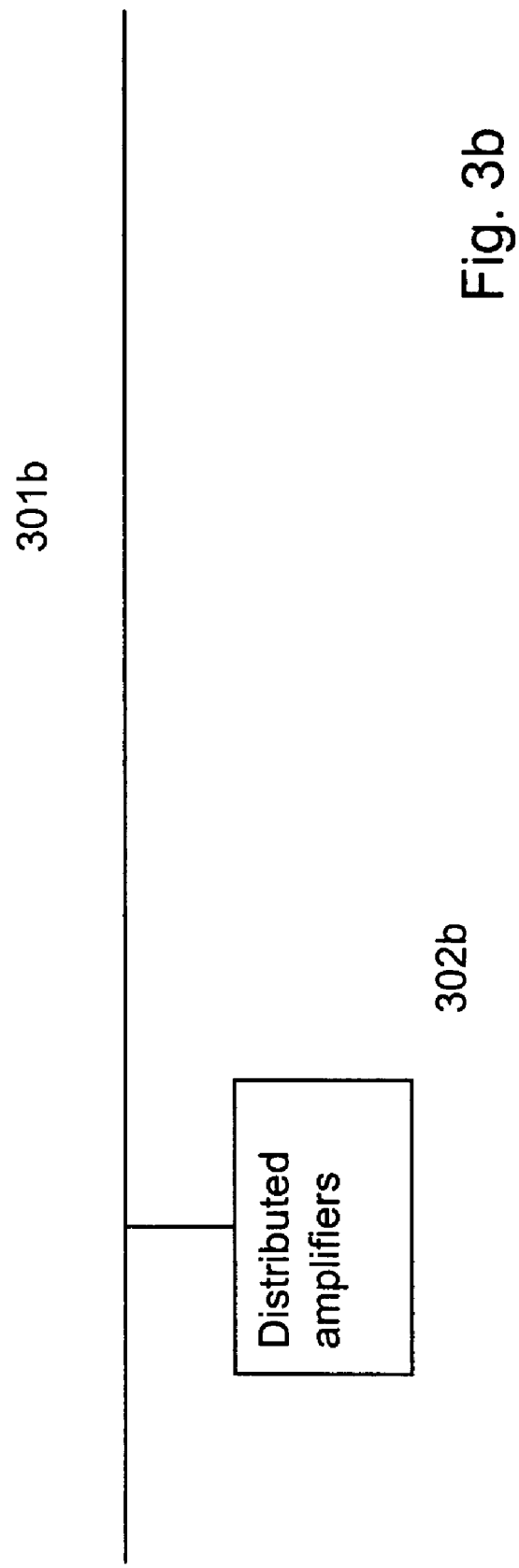

301c

302c

Raman amplifiers

Rare earth amplifiers

Fig. 3d

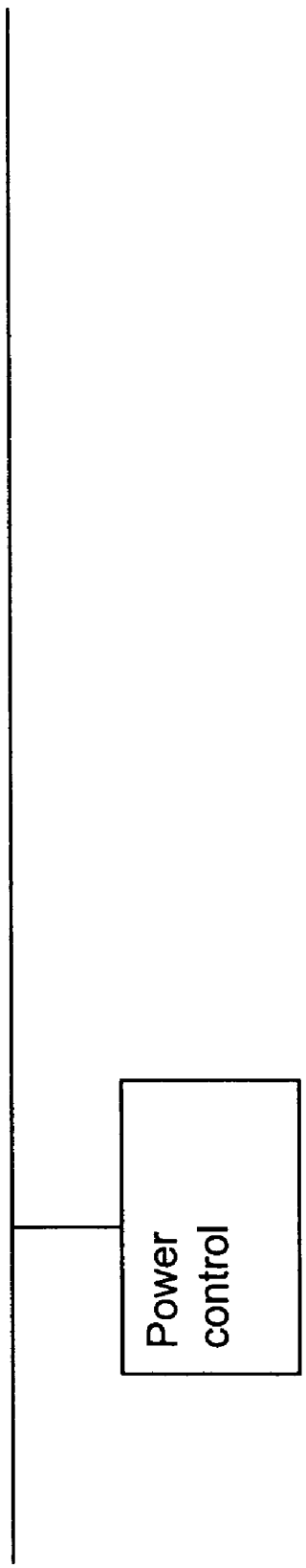

Attenuators

AMPLIFICATION FOR OPTICAL FIBRE ULTRAWIDE BAND TRANSMISSION SYSTEMS

BACKGROUND OF THE INVENTION

The present invention relates to the field of optical transmission, and more particularly to the limitations caused by the Raman effect in optical fiber transmission systems. The invention applies particularly to wavelength division multiplex (WDM) transmission systems.

WDM has made it possible to increase the capacity of optical fiber transmission systems quite considerably. Nevertheless, the Raman effect, or more precisely the crosstalk due to stimulated Raman scattering (SRS) constitutes a major limit; this effect is described, for example, in the work by G. P. Agrawal, entitled "Nonlinear fiber optics", published by Academic Press 1980, for a signal of bandwidth less than or equal to 13 terahertz (THz) (440 cm$^{-1}$). The effect leads to energy being transferred between the channels. For a WDM transmission system, the Raman effect causes gain to be shifted or the spectrum to be tilted after transmission. In other words, a spectrum presenting a plurality of channels at substantially identical power at the beginning of propagation presents, after propagation and because of the Raman effect, lower power levels for those channels at shorter wavelengths. A known solution to this problem consists in adapting the gain of the amplifiers used. Nevertheless, the range of corrections possible with that solution is limited.

N. Zirngibl, in "Analytical model of Raman gain effects in massive wavelength division multiplexed transmission systems", published in Electronics Letters, Vol. 34, No. 14 (1998), pp. 789-790, proposes a model of the effects of Raman crosstalk showing that the spectral distortion induced by stimulated Raman scattering crosstalk depends only on the total injected power, and not on the spectral distribution of that power. In that article, distortion is modelled by perfect "tilt", and provision is made for compensation by a linear fiber presenting tilt that is constant in terms of decibels per nanometer (dB/nm).

By way of example, spectrum tilt is described by S. Bigo et al. in "Investigation of stimulated Raman scattering on WDM structures over various types of fiber infrastructures", published as an OFC '99 paper WJ7, Feb. 21-27, 1999. That document measures the effects of Raman crosstalk in the wavelength range situated around 1550 nm, but it does not propose any solution to the problem.

D. N. Christodoulides and R. B. Jander in "Evolution of stimulated Raman crosstalk in wavelength division multiplexed systems", published in IEEE Photonics Technology Letter, Vol. 8, No. 12, December 1996, pp. 1722-1724, proposes a digital simulation of the crosstalk caused by the Raman effect between the various channels of a WDM transmission system. That document uses a triangular approximation to the Raman gain profile over the multiplex.

A. R. Chraplyvy in "Optical power limits in multi-channel wavelength division multiplexed systems due to stimulated Raman scattering", published in Electronics Letters, Vol. 20, No. 2 (1984), pp. 58-59 also proposes a triangular approximation for Raman gain in a WDM transmission system; it is specified that the models provided in that document can be used for estimating the limitations induced by crosstalk due to the stimulated Raman effect. That document does not propose a solution to the problems raised by such amplification.

A single coherent light wave emitted into a monomode fiber is subjected to losses associated with spontaneous generation of a second wave, and then to it being amplified, because of the Raman effect. The frequency of the resulting wave is reduced by about 13 THz relative to the initial wave. T. Sylvestre et al. in "Stimulated Raman suppression under dual-frequency pumping in single mode fibers", published in Electronics Letters, Vol. 34, No. 14 (1998), pp. 1417-1418 describes an experimental setup enabling these loses to be greatly limited for the wave of interest by eliminating the resulting wave. To do this, a wave whose frequency is about 2×13 THz less than the frequency of the wave of interest is also emitted into the fiber, and a polarization-maintaining fiber is considered. That method of reducing the Raman effect is not applicable to a broad band or a very broad band transmission system.

The French patent application filed on Jun. 10, 1999 under the No. 99/07324 and entitled "Compensation de l'effet Raman par pompage dans un système de transmission à multiplexage en longeur d'onde" [Raman effect compensation by pumping in a wavelength division multiplexed transmission system], proposes injecting pumps at wavelengths lower than those of the signals of a wavelength division multiplex into a link in order to compensate for the tilt caused by the Raman effect on the channels of the multiplex. The energy provided by the pumps compensates for the losses from the initial channels of the multiplex. That solution is proposed for signals at wavelengths lying in the range 1520 nm to 1600 nm, i.e. over bandwidths that are generally less than 80 nm to 100 nm, and that are at most equal to 20 THz.

All of those documents of the state of the art, and also the last-mentioned French patent application, apply to a transmission band centered around 1550 nm, i.e. to wavelengths in the range 1520 nm to 1600 nm.

Kenneth L. Walker in "Status and challenge of optical amplifiers and lasers", published at OAA '98, MB1, pp. 12-14, mentions as a future development the use of the entire spectrum width that is available in optical fibers, i.e. bandwidths of 400 nm or even more in the range 1.2 micrometers (μm) to 1.7 μm. That document specifies that the two main factors which limit the use of the entire spectrum available in a fiber are dispersion and attenuation. It further states that Raman amplification constitutes a good candidate for amplification over a broad band, unlike rare earth doped amplifiers which operate only over a bandwidth of less than 100 μm. To ensure gain flatness, that article proposes using long-period gratings as a filter; the examples proposed show filters in the range 1500 nm to 1600 nm and the resulting gain over a bandwidth of 40 nm.

SUMMARY OF THE INVENTION

The invention proposes a solution to the novel problem of the distortion caused by the Raman effect over very broad bandwidths. In the present specification, the term "very broad band" is used to mean wavelength ranges that extend over more than 150 nm or more than 200 nm, i.e. over more than 20 THz or more than 30 THz.

The invention is based on the observation that the Raman effect over such bandwidths generates distortion by crosstalk between the various channels. This distortion modifies the spectral energy distribution in a manner that is quite different from that already known in the context of narrow band transmission, as mentioned above. These new modifications to spectral distribution must be corrected in order to make transmission possible.

The invention proposes a solution to this new problem.

More precisely, the invention proposes a very broad band wavelength division multiplex transmission system with means for compensating energy transfers between channels caused by the Raman effect. The system presents a bandwidth greater than 20 THz, or indeed greater than 30 THz.

In an embodiment, the bandwidth extends to above 1620 nm, preferably to above 1650 nm or even more preferably to above 1670 nm.

Advantageously, the compensation means compensate for depletion in the channels at the beginning of the band, e.g. over a bandwidth lying in the range 13 THz to 21 THz.

The compensation means can also compensate for enrichment of the channels towards the end of the band, for example over a bandwidth lying in the range 13 THz to 21 THz. In an embodiment, the compensation means compensate for enrichment of channels towards the end of the band by inserting linear losses into the fiber of the transmission system. The compensation means can thus comprise means for emitting lower powers towards the end of the band.

The invention also provides a very broad band optical amplification system including compensation means for compensating the energy transfers that are caused by the Raman effect. The bandwidth is preferably greater than 20 THz, or indeed greater than 30 THz.

Advantageously, the compensation means compensate depletion in the channels towards the beginning of the band, e.g. over a bandwidth lying in the range 13 THz to 21 THz. For this purpose, it is possible to provide distributed amplification means over the beginning of the band. By way of example, these means comprise Raman amplifier means and/or rare earth amplifier means.

In an embodiment the compensation means compensate enrichment of the channels towards the end of the band, e.g. over a bandwidth lying in the range 13 THz to 21 THz.

BRIEF DESCRIPTION OF THE DRAWINGS

Other characteristics and advantages of the invention will appear on reading the following description of embodiments of the invention, given by way of example and made with reference to the accompanying drawing, in which:

FIG. 3a is a block diagram of a very broad band wavelength division multiplexed transmission system according to one embodiment of the present invention.

FIGS. 3b-3f show block diagrams of several embodiments of the very broad band wavelength division multiplexed transmission system of the present invention.

DETAILED DESCRIPTION OF THE INVENTION

The invention is based on the observation that the distortion caused by the Raman effect in very broad band systems is different from the distortion caused by the same Raman effect in conventional WDM transmission systems. As a result, the appearance of the distortion obtained is completely different, see for example the article by S. Bigo et al., which mentions only one tilt, in other words an effect which can be approximated by a straight line of positive slope.

In addition, solutions such as the presence of pumps at wavelengths below those of the multiplex, for example, as proposed in the above-mentioned patent application, can provide compensation only over a few tens of nanometers, and at most over 20 THz.

The invention thus proposes generic compensation of Raman gain effects in very broad band transmission systems.

Figure 1:
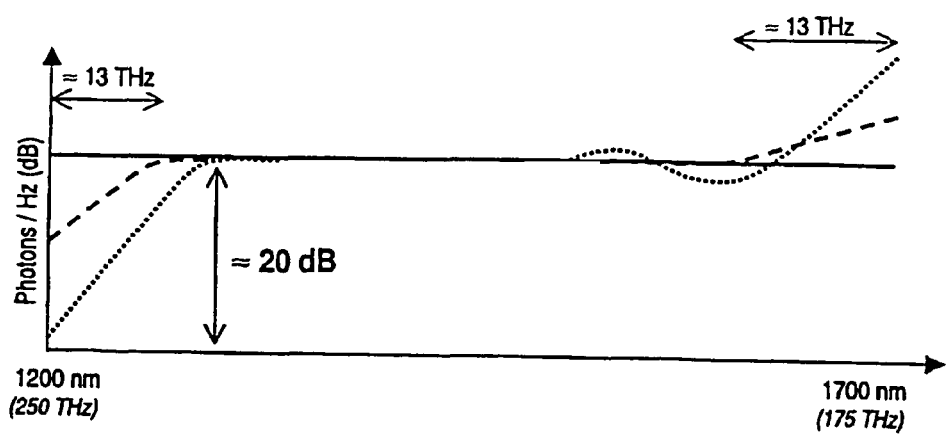
FIG. 1 is a diagrammatic graph showing how spectrum distribution is modified by the Raman effect in a very broad band transmission system.

FIG. 1 is a diagrammatic graph of modifications to the spectral distribution caused by the Raman effect in a very broad band transmission system. Wavelength is plotted in nanometers or in terahertz along the abscissa. Power is plotted in dB up the ordinate. The figure shows the modifications caused by the Raman effect on channels in a multiplex that extends over the range 1200 nm to 1700 nm. The bold line in the figure shows constant power distribution for the various channels of the multiplex, which is the intended result. Dashed line curves show qualitatively the appearance of the departures from this ideal distribution caused by the Raman effect. The graph of FIG. 1 reveals essentially three different zones. A first zone extends from the beginning of the available bandwidth, from 1200 nm or 250 THz, over a wavelength range of about 13 THz or about 85 nm, and more generally over a range having a bandwidth of 13 THz to 21 THz. In this first zone, the channels of the multiplex are subjected to depletion by the Raman effect, to the advantage of channels of longer wavelength. Their power is thus below the nominal power. The dashed line curves are below the bold line curve. Depletion can give rise to power variations of as much as 20 dB or more relative to the nominal power of the channels.

The third zone extends towards the end of the available bandwidth, and in the example shown up to an upper limit of 1700 nm. It covers a wavelength range of about 13 THz or 85 nm, and more generally a range having a width of 13 THz to 21 THz, i.e. about 70 nm to 120 nm. In this third zone, the channels of a multiplex are enriched by the previously mentioned channels, and thus present power that is higher than the expected nominal power. The power difference relative to the nominal power can be as much 20 dB or even more.

The second zone extends between the first and third zones. In this second zone, the signals of the channels in the multiplex are enriched by energy transferred by the Raman effect coming from the preceding channels. The channels of the multiplex are also depleted by energy transfer by the Raman effect towards the following channels. When both of these factors are taken into account, the power in the channels in the second zone is less affected by the Raman effect. This remains true providing conditions are not reached that are so unbalanced as to cause oscillations to appear in the spectral distribution of power. Such conditions are unlikely in a system presenting the proposed compensation in the first and third zones, particularly if the compensation means include distributed amplification at the shorter wavelengths or distributed loss at the longer wavelengths, and even more particularly if it includes both of these two compensation means.

The two dashed line curves in FIG. 1 represent different approximations to the distortions induced by the Raman effect; these distortions are a function in particular of the total injected power, of the bandwidth, of the attenuation, of the effective sectional area, of the composition, and of the length of the fiber.

As mentioned above, it is found that the distortions induced by the Raman effect over a very broad band are quite different from the simple tilting mentioned in the above-cited article by S. Bigo et al. By way of example, FIG. 1 shows a wavelength bandwidth of 500 nm. It is clear that a curve of similar appearance can be found over narrower bands, e.g. having a width of around 250 nm or 300 nm. The use of two distinct and separate bands, e.g. one band around 1.3 µm and another band around 1.55 µm does not lead to distortion of the type shown in FIG. 1, but merely to distortion of the kind described in the state of the art. If channels are added between 1.3 µm and 1.55 µm, e.g. channels in the range 1.4 µm to 1.5 µm or in the range 1.6 µm to 1.7 µm, then distortion will be found having the appearance of FIG. 1. This is due to the fact that having a gap between bands of more than about 20 THz eliminates the incidence of the Raman effect; this effect is at its maximum between bands that are about 13 THz apart.

Figure 2:
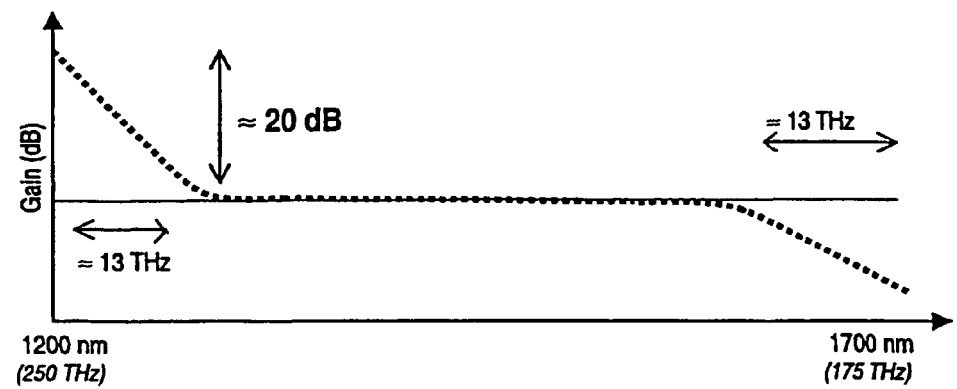
FIG. 2 is a diagrammatic graph showing the appearance of gain for amplification in a very broad band transmission system.

The invention relies on the observation that this distortion is different from the distortion described in the articles of the state of the art. The invention proposes compensating this distortion so as to make transmission possible. FIG. 2 is a diagrammatic graph showing the appearance of gain for amplification in a very broad band transmission system. Wavelength in the range 1200 nm to 1700 nm (or 250 THz to 175 THz) is plotted along the abscissa and proposed gain is plotted up the ordinate. The continuous line represents average amplification corresponding to amplification in the above identified second zone. This is the amplification that would be required if there was no energy transfer due to the Raman effect. The dashed lines shows the appearance of the amplification gain proposed in the invention in order to compensate for the Raman effect distortion.

As shown in the figure, in the first above-identified zone, gain is greater than the average gain and it decreases in substantially linear manner. Its initial value is about 20 dB greater than the average gain and its value decreases progressively until it reaches average gain after about 13 THz to 21 THz. The gain thus compensates for the depletion in those channels that lie in the first zone. In this zone, the invention thus proposes using amplifiers presenting gain that is much greater than the average gain. The slope of these amplifiers is given in FIG. 2, and it can be as much as 20 dB over 80 nm, i.e. about 0.25 dB/nm.

For gain compensation in this first zone, it is advantageous to use distributed amplifiers, e.g. Raman amplifiers. This embodiment relaxes the constraints that need to be imposed on discrete amplifiers for achieving the proposed levels of amplification. In addition, the use of distributed amplifiers over this first zone makes it possible to limit the power used, in particular in comparison with a solution using discrete amplifiers. Such a limit on the level of power that can be injected reduces the distortion induced by the Raman effect.

In the above-defined third zone, gain is less than the average gain. It decreases in a manner that is also substantially linear. The drop in gain thus compensates for the enrichment of the channels in the third zone. As shown in dashed lines in FIG. 1, this enrichment can give rise to oscillations and can result in an excessive consumption of energy. The invention proposes imposing conditions on the longer wavelengths that make it possible to avoid enrichment and to limit such oscillations. In a first embodiment, the invention proposes using powers in this third zone which are at lower level than in the remainder of the band, and that require less amplification. This further decreases the constraints on the amplifiers acting in this zone, whether discrete or distributed. Another solution, which does not exclude the first, consists in extending the transmission window to wavelengths beyond 1620 nm or indeed 1650 nm or even 1670 nm, and in using the increasing linear losses of the transmission fiber to compensate for the distortion induced by the Raman effect. This solution makes it possible in particular to use existing optical fibers for transmission over wavelength bands that were previously believed to be unusable, and for example to use conventional G.652 fibers at wavelengths going up to 1650 nm or 1680 nm or even 1700 nm or beyond. It is also possible to use attenuators in this third zone.

In the second zone, the required variations in gain are small and gain is substantially equal to average gain. It is possible in this zone to use amplifiers having gain that is substantially flat, of the same kind as the amplifiers commonly used in narrow band transmission systems.

The invention thus makes it possible to compensate for the distortion induced by the Raman effect on the channels in a very broad band transmission system.

The invention also proposes other solutions, which combined with the above-described compensation, can make it possible to limit the distortion caused by the Raman effect. In one embodiment, the invention proposes using low powers in the transmission system so as to limit energy transfers by the Raman effect. The optimum power per channel in a very broad band WDM system suffering from Raman crosstalk, particularly if not compensated by other means, is lower than the optimum power that would be appropriate in the absence of this phenomenon (transmission in a narrow band) since it is a non-linear effect. Energy transfers between channels are proportional to the product of the powers in both channels. The use of distributed amplification in the low end of the band also serves to limit power. As shown for smaller bandwidths in the above-cited article by N. Zirngibl, Raman effect crosstalk depends on the total power injected into the fiber. Smaller total power can serve to limit the distortion caused by the Raman effect.

It is also possible to manage the transmission system when traffic is low, i.e. when traffic is below the maximum traffic that can be accepted by the transmission system. Switching off channels that are unused because of the small amount of payload traffic would significantly modify the effects of Raman gain. Although it is indeed possible, such a solution is not preferred and the invention proposes continuing to emit over channels that are lightly loaded, possibly by emitting at lower data rates, and while making sure to use signals that are decorrelated between the various channels. This solution implying the use of loading signals has the advantage of conserving the load on the optical amplifiers and the form of the distortion to be compensated.

The invention thus also provides a very broad band optical amplifier or amplification system for compensating the distortion induced by the Raman effect. The amplification system can comprise an amplifier or a combination of amplifiers having narrower individual bandwidths. For short wavelengths, the amplification system can have amplification means with gain greater than the average gain; in particular it can have distributed amplification means. At long wavelengths, the amplification system can present amplification means with gain that is lower than the average gain.

It is clear that the compensation means described above can compensate for all of the Raman effect energy transfer or can compensate said energy transfer in part only. In particular, total compensation over all of the channels is not always necessary in all transmission systems. The invention is thus not restricted only to providing total compensation over the entire bandwidth under consideration.

Naturally, the present invention is not limited to the examples and embodiments described and shown, but it can be modified in numerous ways by the person skilled in the art. The ranges of wavelengths proposed in the figures are given by way of example only, and the invention applies to all very broad band transmission systems. The amplification means can comprise amplifiers that are discrete or distributed, and the number of amplifiers can vary depending on the application. For distributed Raman type amplification, the Raman amplification can be co- or contra-directional, or both together. In other words, the pump beams can be injected in the signal propagation direction, or in the opposite direction, or simultaneously in both directions. Co-directional amplification is more effective than contra-directional amplification for reducing the effect of Raman crosstalk. Nevertheless it suffers from other drawbacks and as a result it is generally accepted outside the context of the invention that a contradirectional amplification scheme is preferable when using distributed Raman amplification.

In the embodiments descried above, the distributed amplification is Raman amplification. The amplification is not necessarily entirely Raman amplification, and it could equally well be completely or partially constituted by distributed or discrete rare earth amplification. Nevertheless, Raman amplification is preferred in this context in the above-mentioned first zone since it makes it possible to implement an average tilt and to adjust its slope and shape over any range of wavelengths, by an appropriate choice of pumping wavelengths. In contrast, it is difficult to match the various parameters when using rare earth amplification. In any event, it is possible to use Raman amplification, rare earth amplification, or any combination of both in each of the above-defined zones. The amplification can be discrete (i.e. localized) or it can be distributed, or these two modes can be combined.

In the examples given above, consideration is given to transmission over a wavelength bandwidth of 500 nm. Nevertheless, the invention is also applicable to narrower wavelength bandwidths, e.g. bandwidths of about 150 nm or about 20 THz, around 1550 nm. Over such narrower wavelength bands, the solutions proposed in the prior art are not capable of compensating Raman gain totally or partially over the entire bandwidth in question.

In the embodiments described, Raman gain effect compensation is applied to a very broad band transmission system, both at the low end of the band by using amplification and at the high end of the band by using attenuation. This solution also applies to systems which are not very broad band, e.g. systems having a bandwidth of less than 20 THz. Under such circumstances, this dual compensation provides better equalization, and also makes it possible to limit the power used in the shorter wavelength pumps. Compared with a solution involving attenuation over the entire bandwidth, this dual compensation limits total losses in the channels at the shorter wavelengths.

Figure 3:
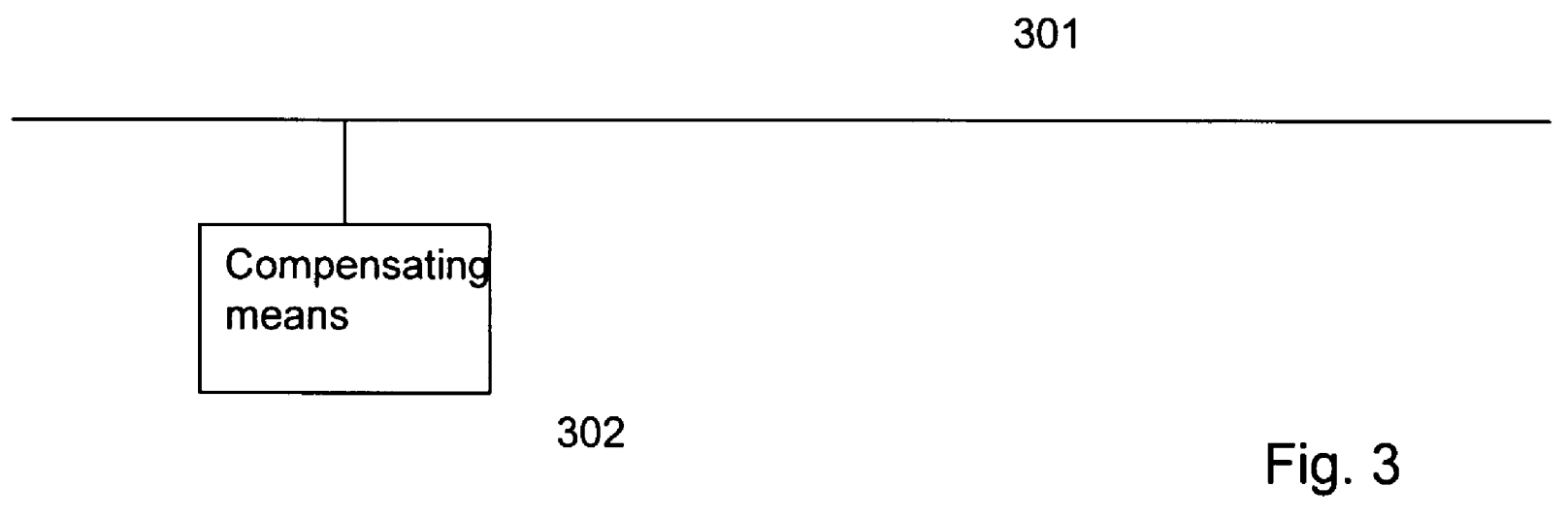
Figure 3A:
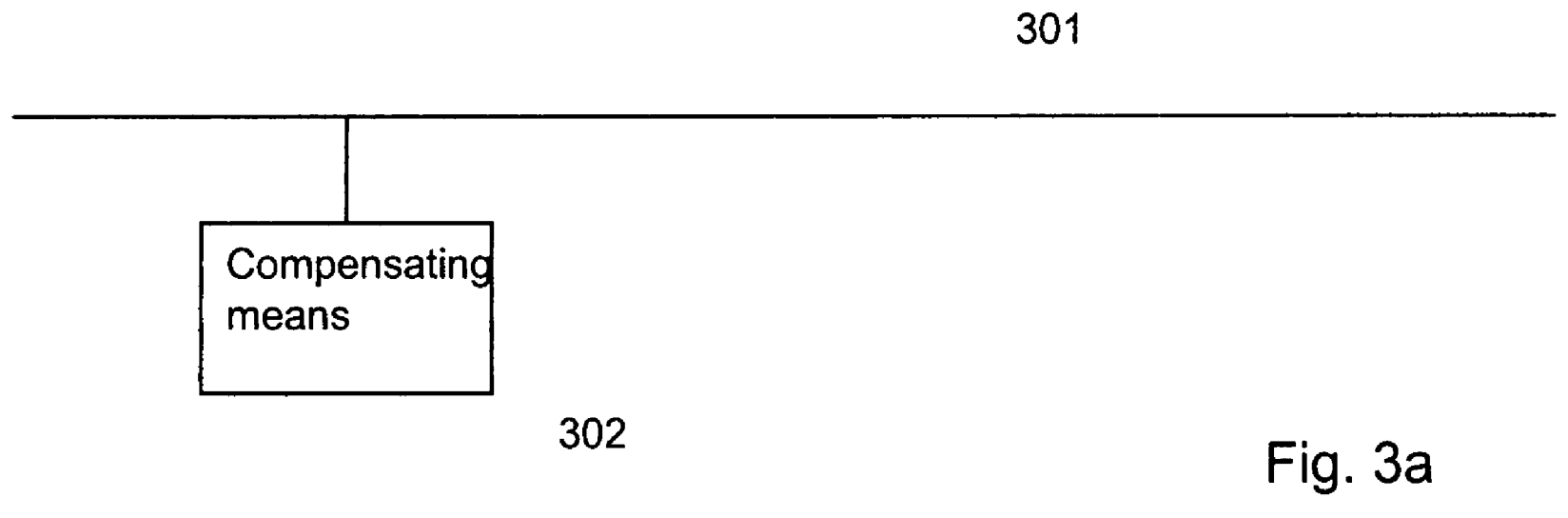
Figure 3C:
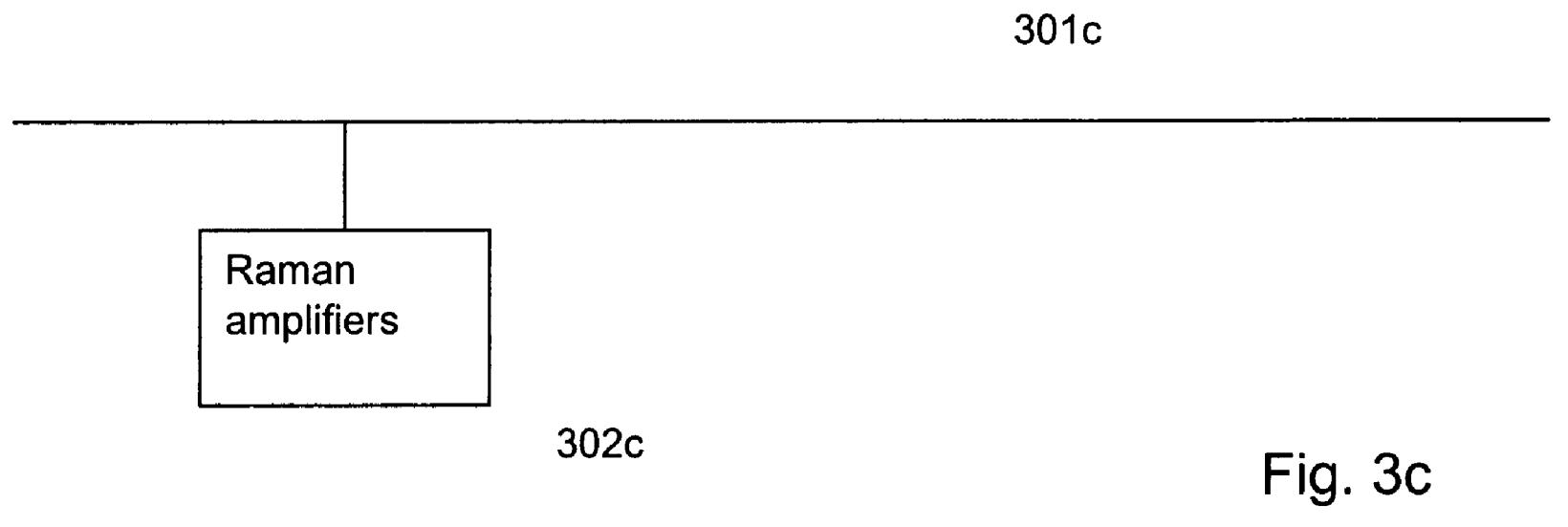
Figure 3D:
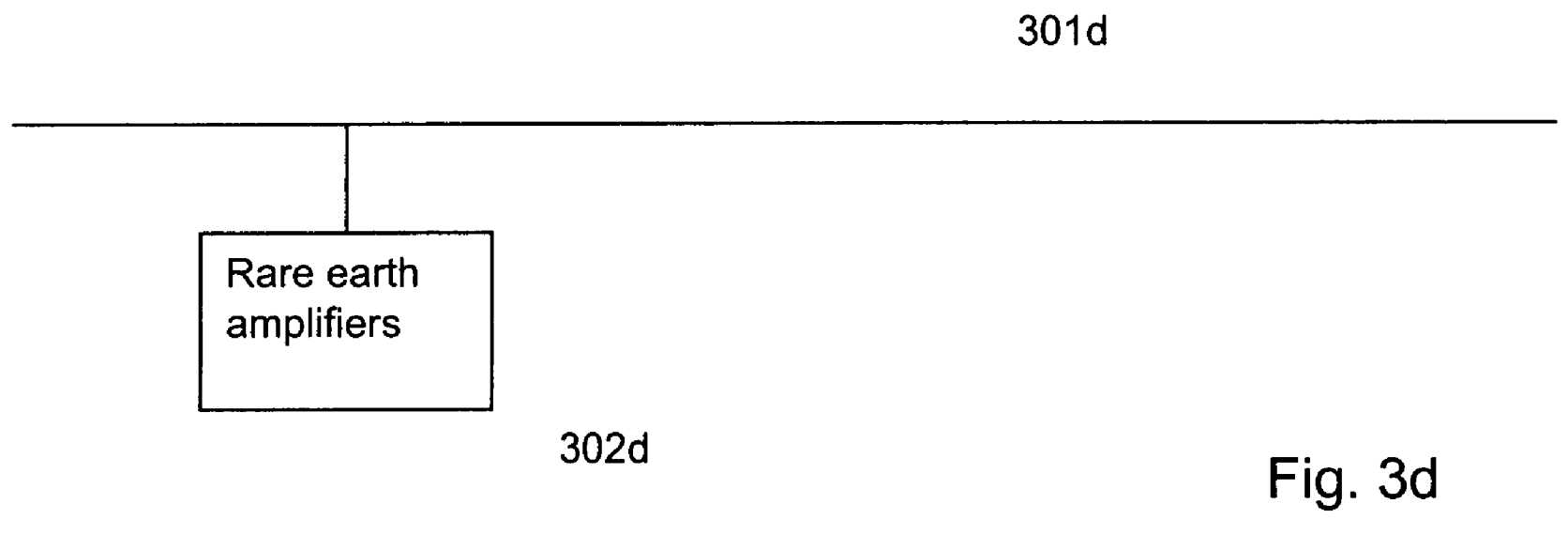
Figure 3F:
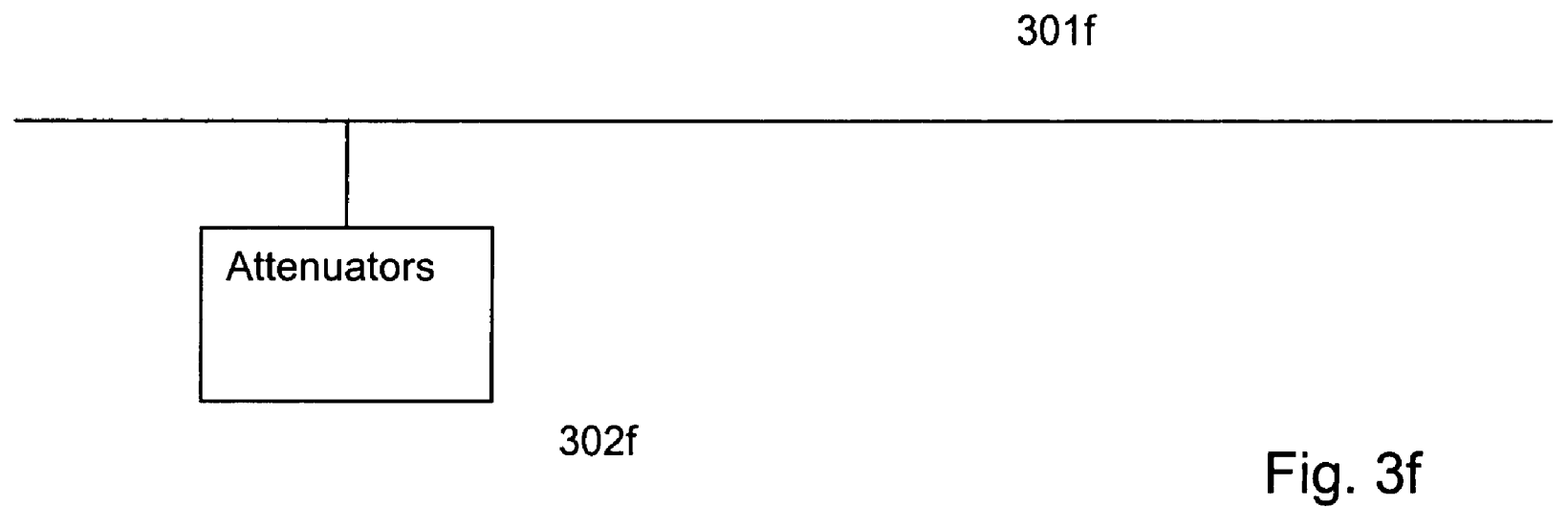

FIG. 3 is a block diagram of a very broad band wavelength division multiplexed transmission system according to one embodiment of the present invention. As shown, compensation means 302 compensates for energy transfers between channels of signals transmitted via an optical fiber 301. As discussed above, the compensation means 302 could include distributed amplification at the shorter wavelengths, or distributed loss at the longer wavelengths, or could include both. The compensation means could be means for emitting lower powers distributed application means (e.g., Raman amplifier means), and/or means for emitting lower powers towards the end of the band.

The invention claimed is:

1. A very broad band wavelength division multiplexed transmission system comprising optical media for carrying signals subject to a Raman effect, said system further comprising means for compensating energy transfers between channels caused by the Raman effect over the very broad band.

2. The system of claim 1, characterized by a bandwidth greater than 20 THz.

3. The system of claim 1, characterized by a bandwidth greater than 30 THz.

4. The system of claim 1, characterized in that said band extends beyond 1620 nm.

5. The system of claim 1, characterized in that the compensation means compensate depletion in channels over the beginning of the band.

6. The system of claim 5, characterized in that the compensation means compensate depletion in the channels at the beginning of the band over a bandwidth lying in the range 13 THz to 21 THz.

7. The system of claim 1, characterized in that the compensation means compensate enrichment of channels over the end of the band.

8. The system of claim 7, characterized in that the compensation means compensate enrichment of the channels over the end of the band over a bandwidth lying in the range 13 THz to 21 THz.

9. The system of claim 7, characterized in that the enrichment of channels over the end of the band is compensated for by the system using lower powers for channels near the end of the band than for channels elsewhere in the band.

10. The system of claim 7, characterized in that the compensation means comprise at least one attenuator.

11. The system of claim 1, characterized in that said band extends beyond 1650 nm.

12. The system of claim 1, characterized in that said band extends beyond 1670 nm.

13. A very broad band optical amplification system comprising optical media for carrying signals subject to a Raman effect, said system further comprising compensation means for compensating energy transfers between channels caused by the Raman effect over the very broad band.

14. The system of claim 13, characterized by a bandwidth greater than 20 THz.

15. The system of claim 13, characterized by a bandwidth greater than 30 THz.

16. The system of claim 13, characterized in that the compensation means compensate depletion in the channels over the beginning of the band.

17. The system of claim 16, characterized in that the compensation means compensate depletion in the channels over the beginning of the band over a bandwidth lying in the range 13 THz to 21 THz.

18. The system of claim 16, characterized in that it comprises distributed amplification means over the beginning of the band.

19. The system of claim 18, characterized in that the distributed amplification means comprise Raman amplification means.

20. The system of claim 18, characterized in that the distributed amplification means comprise rare earth amplification means.

21. The system of claim 13, characterized in that the compensation means compensate enrichment of the channels over the end of the band.

22. The system of claim 21, characterized in that the compensation means compensate enrichment of the channels over the end of the band over a bandwidth lying in the range 13 THz to 21 THz.

23. A very broad band wavelength division multiplexed transmission system comprising an optical fiber for carrying signals subject to a Raman effect, wherein the optical fiber further provides linear losses to compensate enrichment of channels over the end of the very broad band.

24. The system of claim 21, wherein the compensation means attenuate the enrichment of the channels over the end of the very broad band in a distributed way.

* * * * *